US007910656B2

(12) United States Patent
Lutz et al.

(10) Patent No.: US 7,910,656 B2
(45) Date of Patent: Mar. 22, 2011

(54) TOUGHENED EPOXY ADHESIVE COMPOSITION

(75) Inventors: Andreas Lutz, Schwyz (CH); Cathy Grossnickel, Gibswll-Ried (CH); Karsten Frick, Aargao (CH)

(73) Assignee: Dow Global Technologies LLC, Midland, MI (US)

( * ) Notice: Subject to any disclaimer, the term of this patent is extended or adjusted under 35 U.S.C. 154(b) by 594 days.

(21) Appl. No.: 11/078,088

(22) Filed: Mar. 11, 2005

(65) Prior Publication Data

US 2005/0209401 A1 Sep. 22, 2005

(30) Foreign Application Priority Data

Mar. 12, 2004 (EP) .................................... 04005984

(51) Int. Cl.
*C08L 63/00* (2006.01)
*C08L 63/02* (2006.01)
*C08L 63/10* (2006.01)

(52) U.S. Cl. ....................................... 525/113; 525/454

(58) Field of Classification Search .................... 525/113
See application file for complete search history.

(56) References Cited

U.S. PATENT DOCUMENTS

| | | | |
|---|---|---|---|
| 3,514,427 A * | 5/1970 | Owens | 524/524 |
| 4,659,779 A | 4/1987 | Bagga et al. | |
| 4,701,378 A | 10/1987 | Bagga et al. | |
| 4,713,432 A | 12/1987 | Bagga et al. | |
| 4,734,332 A | 3/1988 | Bagga et al. | |
| 4,739,019 A | 4/1988 | Schappert et al. | |
| 4,788,083 A | 11/1988 | Dammann et al. | |
| 4,948,449 A * | 8/1990 | Tarbutton et al. | 156/307.3 |
| 5,030,698 A | 7/1991 | Mülhaupt et al. | |
| 5,073,601 A | 12/1991 | Mülhaupt et al. | |
| 5,194,502 A | 3/1993 | Saito et al. | |
| 5,202,390 A | 4/1993 | Mülhaupt et al. | |
| 5,258,459 A * | 11/1993 | Fujimoto et al. | 525/109 |
| 5,278,257 A | 1/1994 | Mülhaupt et al. | |
| 5,308,895 A | 5/1994 | Gan et al. | |
| 5,393,850 A * | 2/1995 | Siebert et al. | 525/531 |
| 5,574,123 A | 11/1996 | Bock et al. | |
| 5,756,634 A | 5/1998 | Braunstein et al. | |
| 6,258,918 B1 | 7/2001 | Ho et al. | |
| 6,776,869 B1 * | 8/2004 | Schenkel | 156/331.7 |
| 6,998,011 B2 | 2/2006 | Schoenfeld et al. | |
| 2003/0187154 A1* | 10/2003 | Schoenfeld et al. | 525/523 |
| 2004/0181013 A1 | 9/2004 | Schenkel | |
| 2005/0070634 A1 | 3/2005 | Lutz et al. | |
| 2006/0205897 A1 | 9/2006 | Frick et al. | |
| 2006/0276601 A1 | 12/2006 | Lutz et al. | |

FOREIGN PATENT DOCUMENTS

| | | |
|---|---|---|
| WO | WO 9600754 | 1/1996 |
| WO | WO 03/054069 | 7/2003 |
| WO | WO 2005/007766 | 1/2005 |

OTHER PUBLICATIONS

Pham, Ha Q.; Marks, Maurice J. "Epoxy Resins" Encyclopedia of Polymer Science and Technology. John Wiley & Sons, Inc. pp. 678, 684-687. Published date: Jul. 15, 2004.*
Database WPI Section Ch, Week, 199121, Derwent Publications Ltd., London, GB; AN 1991-151142, XP002307834 & JP 03043481 Raytheon Co., Feb. 25, 1991—Abstract.
JP2011616A, Jan. 16, 1990, Manufacture of Composition of Butadiene-Based Copolymer and Terminal Urethane Polymer and Bridging Product Thereof, Rorufu Miyuruhauputo et al., This is a family member of EP0338985, Abstract.
Derwent Abstract No. AN 1986-293167; EP 200678A: M. Bagga et al.
Derwent Abstract No. AN 1989-094899; EP 308664; C.S. Adderley et al.
Derwent Abstract No. AN 1982-85987E, EP 62780; Blum et al.
Derwent Abstract No. AN 1991-172761, EP 431414, G. Grogler et al.
Derwent Abstract No. AN 1994-007471, EP 598873, T. Abend et al.
Derwent Abstract No. AN 1984-050098, EP 103323. G. Groegler et al.
Derwent Abstract No. AN 2000-453042, DE 19858921, A. H. Schenkel.
Derwent Abstract No. AN 1990-031716, EP 353190A, R. Mülhaupt et al.
Noveon, Product Data Sheets, Hycar® Reactive Liquid Polymers CTBN 1300X13 & CTBN 1300X13F, 3 pages.
Hexion Specialty Chemicals, Product Data Bulletin, EPON™ Resin 828, re-issued: Sep. 2005, RP: 3075.
Journal of Materials Science 27 (1992), pp. 111-121, T.K. Chen et al., Fracture mechanism of Toughened Epoxy Resin with Bimodal Rubber-Particle Size Distribution, 1992 Chapman & Hall.
Struktol, Technical Data Sheet, Schill + Seilacher AG, Struktol® Polydis 3604, 2 pages, Hamburg, Germany.
Journal of Applied Polymer Science, vol. 47, pp. 991-1002, E. Urbaczewski-Espuche et al., Toughness Improvement of an Epoxy/Anhydride Matrix. Influence on Processing and Fatigue Properties of Unidirectional Glass-Fiber Composites, 1993, John Wiley & Sons, Inc.
Journal of Materials Science 21 (1986) pp. 2462-2474, A.F. Yee et al., Toughening Mechanisms in Elastomer-Modified Epoxies, Chapman and Hall Ltd., Part 1, Mechanical Studies.

* cited by examiner

*Primary Examiner* — Mark Eashoo
*Assistant Examiner* — Peter F Godenschwager
(74) *Attorney, Agent, or Firm* — Gary C Cohn PLLC

(57) ABSTRACT

The invention relates to an epoxy adhesive composition comprising
a) a first epoxy resin,
b) a second epoxy resin modified with an acrylonitrile-butadiene rubber, the latter comprising on average less than about 25 weight percent acrylonitrile, and
c) a toughener.
The total amount of component b) and component c) is higher than about 30 percent based on the total weight of the composition, and the weight ratio of component c) to component b) is greater than about 1:1.
The invention further relates to the use of said epoxy adhesive composition for the assembly of parts of a vehicle. It also relates to a vehicle, parts of which are assembled by said epoxy adhesive composition.

6 Claims, No Drawings

TOUGHENED EPOXY ADHESIVE COMPOSITION

FIELD OF INVENTION

The present invention relates to an epoxy based adhesive composition, the use of the epoxy based adhesive composition for the assembly of parts of a vehicle and a vehicle assembled using the epoxy based adhesive composition.

BACKGROUND OF INVENTION

Epoxy based adhesive compositions are reactive adhesive compositions comprising an epoxy resin, a curing agent and usually an accelerator. Upon heat-activation, the epoxy groups of the epoxy resin react with the curing agent linking the epoxy resin compounds by a polyaddition reaction to obtain a cured product. Such a cured product is known to have good mechanical properties and a chemical resistance superior to the cured product of other reactive adhesives. These characteristics make epoxy adhesive compositions particularly useful for demanding applications where stringent mechanical requirements must be satisfied, for example, in the automotive industry.

The cured product of an epoxy adhesive other than a structural epoxy adhesive generally has a relatively high static strength, for example, a high tensile and lap shear strength. Its dynamic strength however, i.e., its impact peel strength, is generally low. Adhesives used for the assembly of parts of a vehicle, such as cars, vans, lorries, trucks and trains, are called structural adhesives. The cured product of such a structural adhesive has to bear high static and dynamic loads. For that purpose, additional flexibilizers and/or tougheners are to be added to the epoxy adhesive composition.

Structural epoxy adhesives have been described in several patent applications: EP-A-0 197 892; (U.S. Pat. No. 4,659, 779; U.S. Pat. No. 4,713,432; U.S. Pat. No. 4,734,332; U.S. Pat. No. 4,701,378, all incorporated herein by reference) describes a structural adhesive comprising an epoxy resin, a nitrogen comprising toughener and an accelerator. The problem described by this application is to provide a structural adhesive having a good storage stability and a high curing rate. EP-A-0 308 664 and (U.S. Pat. No. 5,278,257 all incorporated herein by reference) describes an epoxy adhesive composition comprising a butadiene-acrylonitrile copolymer in combination with a polyphenol-terminated polyurethane or polyurea. EP-A-0 353 190; (U.S. Pat. No. 5,073,601; U.S. Pat. No. 5,202,390, all incorporated herein by reference) describes an epoxy adhesive composition comprising a butadiene-acrylonitrile copolymer in combination with a polyether-, polyester, polythioester or polyamide prepolymer terminated with a functionalized carbocyclic aromatic or araliphatic residue. The technology according to EP-A-0 308 664 and EP-A-0 353 190 is called Mühlhaupt technology. The problem described by both EP-A-0 308 664 and EP-A-0 353 190 is to improve the impact peel strength of the cured product. At low temperatures however, the impact peel strength is low. WO 00/20483 and (U.S. Ser. No. 2004/81013 all incorporated herein by reference) relates to a composition comprising an epoxide-reactive copolymer having a glass transition temperature of −30° C. or less, and a reaction product of a carboxylic acid anhydride with a di- or polyamine and a polyphenol or aminophenol. The cured product of WO 00/20483 has an impact peel strength of less than 20 N/mm at −40° C.

Since vehicles are normally exposed to varying climatic conditions, the cured product of a structural adhesive is required to have good mechanical properties at room temperature as well as at low temperatures. Because of their low impact peel strength values at low temperatures, the above known epoxy adhesives do not fully meet this requirement. Vehicles, parts of which are assembled by the above known epoxy adhesives, consequently do not fully comply with safety requirements, for example, in a crash test. A further disadvantage of the above known epoxy adhesive compositions are their relatively low impact behaviour on high strength metals both at moderate and at extreme temperatures. Due to this disadvantage, the use of the known epoxy adhesive compositions for assembling the parts of a high strength metal construction is limited.

There is a need to provide an epoxy adhesive composition which upon curing results in a product having superior mechanical properties, in particular a high impact peel strength, at temperatures as low as about −40° C., while maintaining the desirable mechanical properties of conventional epoxy adhesive compositions at room temperature. There is a further need to provide an epoxy adhesive composition which upon curing results in a product having a high impact peel strength on high strength metals.

SUMMARY OF INVENTION

The present invention is a composition comprising:
a) a first epoxy resin,
b) a second epoxy resin modified with an acrylonitrile-butadiene rubber, the latter comprising on average less than about 25 weight percent acrylonitrile, and
c) a toughener,
the total amount of component b) and component c) being more than about 30 percent based on the total weight of the composition, and the weight ratio of component c) to component b) being greater than about 1:1.

In another embodiment, the invention is a method of bonding parts of a vehicle together comprising contacting two or more parts of a vehicle with the epoxy adhesive composition according to the invention, wherein the adhesive is disposed between the two parts and allowing the adhesive to cure.

The epoxy adhesive composition of the present invention results upon curing in a product having an impact peel strength of more than about 35 N/mm at room temperature and of more than about 25 N/mm at about −40° C. The vastly improved impact strength at low temperatures allows the epoxy adhesive composition to be used as a structural adhesive which upon curing has a high crash resistance at any temperature of use and satisfies the most stringent safety requirements. Due to its improved toughening, the cured product of the epoxy adhesive composition of the present invention has a superior impact peel strength on high strength metals. Assembly of high strength metal parts by the epoxy adhesive composition of the present invention allows the resulting high strength metal construction to be higher loaded than a construction bonded with conventional adhesives. The applicability of the epoxy adhesive compositions of the present invention for the assembly of high strength metal parts is highly desirable, since bonding of high strength metal by welding is often not feasible. Apart from the improved dynamic strength, the cured epoxy adhesive composition has an excellent static strength in a temperature range of from about −40° C. to about +80° C. The lap shear strength is higher than about 25 MPa and the tensile strength is higher than about 30 MPa. It has a young modulus of about 1500 MPa and a tensile elongation at break of more than about 10 percent. The epoxy adhesive composition of the present invention shows an excellent adhesion on coated steels like hot-dipped, electro-galvanized and bonazinc steel, pretreated aluminum, magnesium and composites. After long-term artificial aging tests known to a skilled person, such as VDA, KKT, P1210 and 3C, or short term artificial aging tests (cataplasma), the strength values of the epoxy adhesive composition of the present invention are decreased by only about 20 to about 30 percent.

DETAILED DESCRIPTION OF THE INVENTION

The first epoxy resin (component a) can be any kind of epoxy resin, such as liquid epoxy resin, for instance, DER™ 330 low viscosity, undiluted, bisphenol A liquid epoxy resin, DER™ 331 standard, undiluted bisphenol A liquid epoxy resin or a solid epoxy resin, for instance, DER™ 671 low molecular weight solid epoxy resin, all DER™ epoxy resins available from The Dow Chemical Company. Preferred examples of the first epoxy resin are polyglycidyl ethers of bisphenols, such as 2,2-bis-(4-hydroxyphenyl)-propane or bis-(4-hydroxyphenyl)-methane, of novolacs, which are formed by the reaction of formaldehyde with a phenol, and adducts of bisphenol A with aliphatic diols having glycidyl groups.

In a preferred embodiment, component a) is a mixture of at least two different epoxy resins. It is preferred that at least one epoxy resin is liquid at room temperature.

The second epoxy resin is modified with an acrylonitrile-butadiene rubber (component b). Preferably, component b) comprises at least about 30 weight percent, preferably at least about 40 weight percent of acrylonitrile-butadiene rubber. Preferably, the acrylonitrile-butadiene rubber has an acrylonitrile content of about 10 to about 26 percent by weight. The acrylonitrile-butadiene rubber is preferably carboxy terminated and preferably comprises X8, X31 or any mixture of X8, X31 and X13 (wherein X stands for a copolymer rubber of the CTBN (carboxy-terminated butadiene-rubber) type and the term "mixture" means a "mixture of two or three of the components").

X8 is a CTBN type acrylonitrile-butadiene-rubber containing about 17 percent acrylonitrile.

X13 is a CTBN type acrylonitrile-butadiene-rubber containing about 26 percent acrylonitrile.

X31 is a CTBN type acrylonitrile-butadiene-rubber containing about 10 percent acrylonitrile.

It is preferred that the acrylonitrile-butadiene rubber comprises less than about 20 weight percent, preferably less than about 15 weight percent of acrylonitrile based on the total weight of the acrylonitrile-butadiene rubber.

Toughener component c) is preferably a phenolic moiety terminated elastomer. More preferably, the elastomer is a polyurethane, polyurea or a polyurea-urethane.

Preferably, the toughener component c) comprises a compound of Formula I

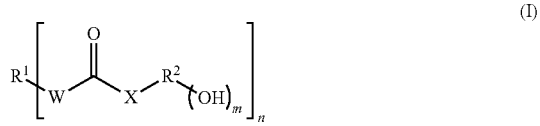

(I)

wherein m is 1 or 2, n is 2 to 6, $R^1$ is an n-valent radical of an elastomeric prepolymer after the removal of the terminal isocyanate, amino or hydroxyl group, the elastomeric prepolymer being soluble or dispersible in epoxy resin, W and X are independently —O— or —$NR^3$—, at least one of W and X being —$NR^3$—, $R^2$ is an m+1-valent radical of a polyphenol or aminophenol after the removal of the phenolic hydroxyl group and optionally of the amino group, and $R^3$ is hydrogen, a $C_1$ to $C_6$ alkyl or phenol. A detailed description of the toughener of Formula I is given in EP-A-0 308 664 (page 5, line 14, to page 13, line 24), (U.S. Pat. No. 5,278,257 at column 2, lines 14 to 33 and column 4, line 19 and column 16, line 18), the disclosure of which is incorporated herein by reference.

In a further preferred embodiment, the composition comprises as component c) a compound of Formula II

(II)

wherein p is 1 or 2, q is 2 to 6, Y is —O—, —S— or —$NR^6$—, Z is a radical selected from the group consisting of —OH, —$NHR^6$, —OCN,

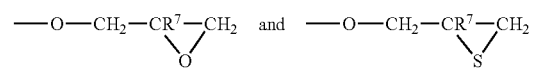

$R^4$ is a residue of a hydroxyl-, mercapto- or amino-terminated polyether prepolymer or of a hydroxyl-, mercapto- or amino-terminated prepolymeric, segmented polyester, polythioester or polyamide, $R^5$ is a carbocyclic aromatic or aralipathic p+1-valent radical with groups Z bonded directly to the aromatic ring, $R^6$ is hydrogen, $C_1$ to $C_6$ alkyl or phenyl, and $R^7$ is methyl or hydrogen. A detailed description of the toughener of Formula II is given in EP-A-0 353 190 (page 3, line 51, to page 6, line 62), (U.S. Pat. No. 5,202,390 at column 1, line 59 to column 2, line 16 and column 3, line 60 to column 9, line 21), the disclosure of which is incorporated herein by reference.

The composition can comprise a mixture of both a compound of Formula I and Formula II as component c).

Examples of component c) are RAM A, RAM B or RAM C. RAM A, RAM B and RAM C are compounds of Formula I, RAM A being allylphenol-terminated polyurethane elastomer, RAM B being bisphenol A-terminated polyurethane elastomer and RAM C being alkylphenol-terminated polyurethane elastomer. A further example is RAM 965 is an allylphenol-terminated polyurethane elastomer, which is known to a skilled person.

A particular good impact behaviour at low temperature and on high strength steel is achieved if component b) is in an amount of from about 14 to about 20 percent and component c) is in an amount of from about 18 to about 28 percent based on the total weight of the composition. Particularly good results are achieved if the epoxy adhesive composition comprises a total amount of component b) and component c) of at least about 35 weight percent, preferably about 38 weight percent. In a further preferred embodiment, the weight ratio of component c) to component b) is greater than about 1.3:1, preferably greater than about 1.5:1. The epoxy adhesive composition according to the present invention can further include additives, such as fillers and accelerators, which are known to a person skilled in the art. In a preferred embodiment, the composition comprises as an accelerator a solid solution of a nitrogen base having a boiling point above about 130° C. and a phenolic polymer which is an addition polymer of a phenol having an unsaturated substituent. (The term "solid solution" means the combination of the components in a solid one-phase system). A detailed description of such an accelerator is given in EP-A-0 197 892 (page 7, line 7, to page 10, line 28), (U.S. Pat. No. 4,659,779 at column 2, lines 45 to 59, column 4, line 35 to column 6, line 51), the disclosure of which is incorporated herein by reference. Among these accelerators, tris(dimethylamino-methyl)phenole embedded in a polymer matrix, which is known to a skilled person is particularly preferred.

The epoxy adhesive composition is preferably used for the assembly of parts of a vehicle, such as cars, vans, lorries, trucks and trains. It can also be used for assembling parts of boats and aircrafts.

The epoxy adhesive composition of the present invention is preferably applied at a temperature of about 40° to about 65° C. It can be applied manually or automatically by a robot as normal beads, by swirling or by jet-streaming. The curing starts at temperatures above about 140° C.

EXAMPLES

Preparation of Epoxy Adhesive Composition 7 weight percent Struktol™ 3604 epoxy resin (Schill & Seilacher), 7 weight percent Struktol™ 3914 epoxy resin, 11 weight percent DER™ 330 epoxy resin, 20.2 weight percent DER™ 331 epoxy resin, 16.3 weight percent DER™ 671 epoxy resin, 24 weight percent toughener RAM B and 0.2 weight percent DW 0135 blue (Huntsman) are mixed in a laboratory planetary mixer at 90° C. for 30 minutes. Then, 0.6 weight percent adhesion promoter, such as an epoxy silane, 4.3 weight percent fumed silica (Aerosil; Degussa) and 0.2 weight percent of a wetting agent are added and the mixture is stirred at room temperature for another 30 minutes. Then, 4.2 weight percent dicyanoguanidine, (Cyanoguanidine, Airproducts), 0.75 weight percent of accelerator tris(dimethylaminomethyl)phenole embedded in a polymer matrix (Huntsman) and 3.2 weight percent of a gelling compound are added and the mixture is stirred at room temperature for another 15 minutes. All mixing steps are performed under vacuum.

Testing of Epoxy Adhesive Composition

The adhesive itself demonstrates the following standard values after curing at temperatures higher than 140° C.

E modulus: about 1500 MPa
Tensile strength: about 35 MPa
Elongation: about 15 percent
Viscosity at 45° C.: 158 Pa
Yield point at 45° C.: 47 Pa
Lap shear (1.5 mm; CRS 14O3): >25 MPa
Impact peel strength at room temperature (1 mm; CRS 14O3): >35 N/mm
Impact peel strength at −40° C. (1 mm; CRS 14O3): >25 N/mm VDA testing was performed on pretreated aluminum, hot dipped, electro galvanised and bonazinc coated steel and showed a decrease in strength by only about 20 to about 30 percent. Other artificial aging tests like KKT, P 1210, 3° C. and cataplasma showed similar results.

TABLE 1

Low temperature impact behaviour:

| Example | Impact peel strength at room temperature [N/mm] | Impact peel strength at −40° C. [N/mm] | Component b/ amount wt % | Component C/ amount wt % | Ratio of Component C to Component B |
|---|---|---|---|---|---|
| 1 | 53 | 43 | Struktol 3914/20 | RAM 965/30 | 3:2 |
| 2 | 40 | 39 | Struktol 3914/20 | RAM B/30 | 3:2 |
| 3 | 32 | 29 | Struktol 3914/15 | RAM B/25 | 1.7:1 |
| 4 | 47 | 41 | Struktol 3914/14 | RAM B/28 | 2:1 |
| 5 | 37 | 40 | Struktol 3914/12 | RAM B/24 | 2:1 |
| 6 | 54 | 47 | Struktol 3604/14 | RAM B/28 | 2:1 |
| 7 | 51 | 30 | Struktol 3914/14 | RAM B/20 | 1.4:1 |
| 8 | 30 | 12 | Struktol 3914/15 | RAM B/15 | 1:1 |
| 9 | 54 | 41 | Struktol 3604 and 3914/7.7 | RAM B/24 | 1.7:1 |
| 10 | 42 | 47 | Struktol 3604 and 3914/7.7 | RAM 965/24 | 1.7:1 |
| 11 | 42 | 19 | Struktol 3614/14 | RAM B/24 | 1.7:1 |
| 12 | 43 | 45 | Struktol 3914-1/14 | RAM B/24 | 1.7:1 |
| 13 | 44 | 44 | Struktol 3614-2/14 | RAM B/24 | 1.7:1 |
| 14 | 44 | 10 | Struktol 3604/14 | RAM 965/14 | 1:1 |
| 15 | 38 | 13 | Struktol 3614/14 | RAM 965/14 | 1:1 |

In Examples, 1, 14 and 15, conventional toughened epoxy based structural adhesives were used In Example 1 BETAMATE™ 1496C available from The Dow Chemical Company was used.

In Table 1, the rubber modified epoxy resins (component b) are characterized as follows:

Struktol 3604 is a rubber modified epoxy resin consisting of about 60 percent diglycidyl ether of bisphenol A (DGEBA) and 40 percent X8.

Struktol 3614 is a rubber modified epoxy resin consisting of about 60 percent DGEBA and about 40 percent X13.

Struktol 3914 is a rubber modified epoxy resin consisting of about 60 percent DGEBA and about 40 percent of a mixture of X31 and X8, wherein X31:X8=1:1.

Struktol 3914-1 is a rubber modified epoxy resin consisting of about 60 percent DGEBA and about 40 percent of a mixture of X31 and X8, wherein X31:X8=3:1.

Struktol 3914-2 is a rubber modified epoxy resin consisting of about 60 percent DGEBA and about 40 percent of a mixture of X31 and X8, wherein X31:X8=1:3.

The values of the impact peel strength were determined according to ISO 113 43.

As can be seen from Table 1, the epoxy adhesive compositions according to the present invention have a significantly higher impact peel strength at −40° C. than the conventional epoxy adhesive compositions.

TABLE 2

Impact peel strength on high strength steels: values in N/mm at room temperature

| Steel type | Example | | | |
|---|---|---|---|---|
| | 16 | 17 | 18 | 19 |
| H300XD Z100, 1 mm | 43 | 36 | 33 | 15 |
| H400TD Z100, 1 mm | 42 | 34 | 31 | 14 |
| RAGAL600DP Z100, 1 mm | 31 | 29 | 21 | 8 |
| DOCOL 1000DP ZE75/75, 0.9 mm | 33 | 21 | 22 | 6 |

H300XD Z100, H400TD Z100, RAGAL600DP Z100, DOCOL 1000DP ZE75/75 are high strength steels known to a skilled person. As can be seen from Table 2, the epoxy adhesive composition according to the present invention shows a significantly higher impact peel strength on high strength steel compared to known structural adhesive compositions. In Examples 17, 18 and 19, commercial adhesives were used, BETAMATE™ 1480, BETAMATE™ 1496V and BETAMATE™ 1040 epoxy adhesives were used.

TABLE 3

Lap shear strength on high strength steel: values in MPa at room temperature

| Steel type | Example | | | |
|---|---|---|---|---|
| | 16 | 17 | 18 | 19 |
| H300XD Z100, 1 mm | 32 | 33 | 34 | 39 |
| H400TD Z100, 1 mm | 31 | 38 | 37 | 37 |
| RAGAL600DP Z100, 1 mm | 34 | 35 | 35 | 35 |
| DOCOL 1000DP ZE75/75, 0.9 mm | 33 | 37 | 38 | 37 |

Table 3 shows the lap shear strengths values of known structural adhesive compositions being maintained in the epoxy adhesive composition according to the present invention.

The invention claimed is:

1. A composition comprising:
   a) a first epoxy resin comprising one or more polyglycidyl ethers of bisphenols, polyglycidyl ethers of novolacs or adducts of bisphenol A with aliphatic diols having glycidyl groups;
   b) a second epoxy resin modified with at least about 30 weight percent of a mixture comprising three different acrylonitrile-butadiene rubbers comprising
      b1) one comprising about 10 weight percent of acrylonitrile;
      b2) one comprising about 17 weight percent of acrylonitrile and
      b3) one comprising about 26 weight percent of acrylonitrile,
   the mixture of rubbers comprising on average less than about 20 weight percent acrylonitrile, and
   c) a toughener comprising a polyurethane, polyurea, or polyurethane elastomer terminated with phenolic moieties;
   the total amount of component b) and component c) being more than about 30 percent based on the total weight of the composition, the weight ratio of component c) to component b) being greater than about 1.3:1, the composition containing at least 4.2 weight percent of the acrylonitrile-butadiene rubber, and the cured composition demonstrates an impact peel strength at −40° C. of greater than 25 N/mm.

2. A composition according to claim 1 comprising as component c) a compound of formula (I)

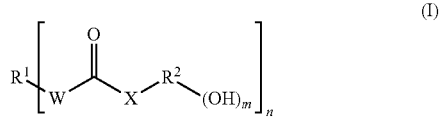

wherein:
m is 1 or 2;
n is 2 to 6;
$R^1$ is an n-valent radical of an elastomeric prepolymer after removal of a terminal isocyanate, amino or hydroxyl group, the elastomeric prepolymer being soluble or dispersible in epoxy resin;
W and X are independently —O— or —$NR^3$—, at least one of W and X being —$NR^3$;
$R^2$ is an m+1-valent radical of a polyphenol or aminophenol after the removal of a phenolic hydroxyl group and optionally of the amino group; and
$R^3$ is hydrogen, a $C_1$ to $C_6$ alkyl or phenol.

3. A composition according to claim 1 which comprises component b) in an amount of from 14 to about 20 weight percent and component c) in an amount from about 18 to 28 weight percent based on the total weight of the composition.

4. A composition according to claim 1 wherein the total amount of component b) and component c) is at least about 35 weight percent.

5. A composition according to claim 1 wherein component a) is a mixture of at least two different epoxy resins.

6. A composition according to claim 5 wherein component a) comprises at least one epoxy resin that is liquid at room temperature.

* * * * *